O. H. BARTHOLOMEW.
WHEEL RIM.
APPLICATION FILED JULY 17, 1916.
1,219,798.
Patented Mar. 20, 1917.
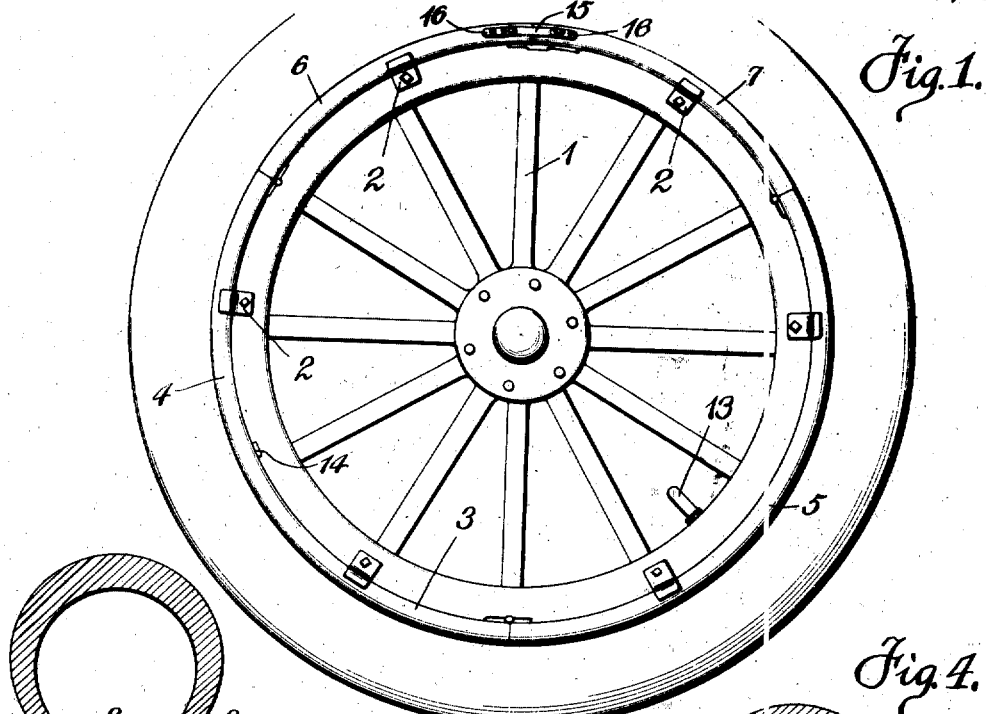
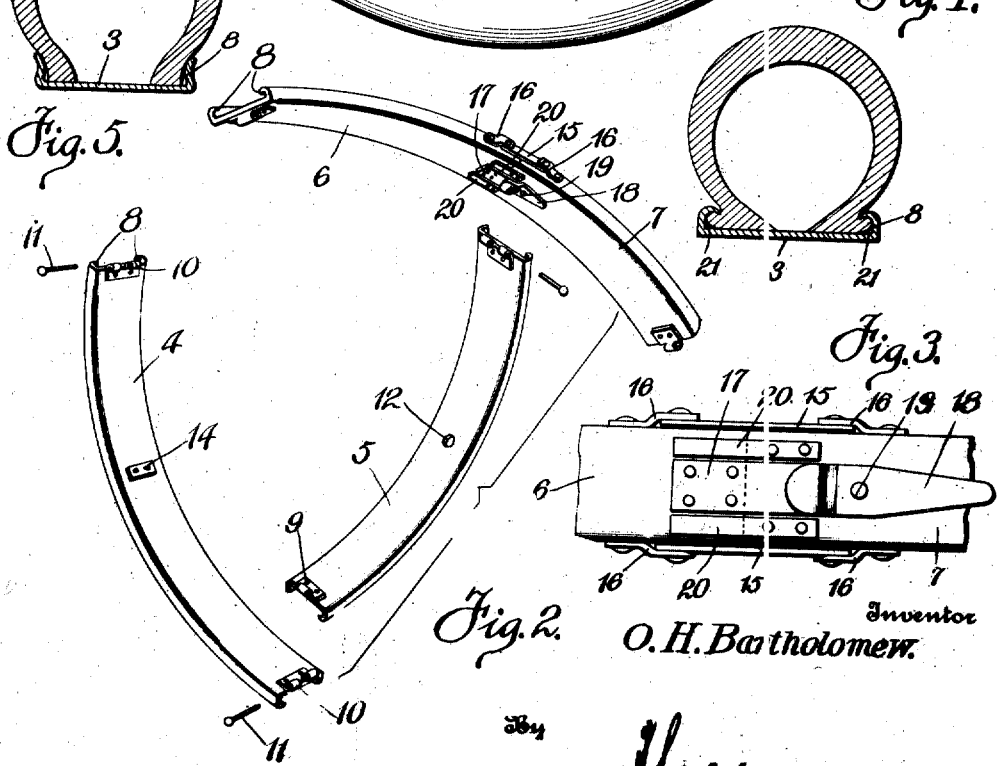
Inventor
O. H. Bartholomew.

UNITED STATES PATENT OFFICE.

OHMER H. BARTHOLOMEW, OF PEORIA, ILLINOIS, ASSIGNOR OF ONE-HALF TO JOSEPH HALBROHR, OF PEORIA, ILLINOIS.

WHEEL-RIM.

1,219,798.  Specification of Letters Patent.  Patented Mar. 20, 1917.

Application filed July 17, 1916. Serial No. 109.762.

*To all whom it may concern:*

Be it known that I, OHMER H. BARTHOLOMEW, a citizen of the United States, residing at Peoria, in the county of Peoria and State of Illinois, have invented certain new and useful Improvements in Wheel-Rims, of which the following is a specification.

This invention relates to rims for supporting pneumatic tires upon a wheel and the object of the invention is to provide a rim which may be quickly and easily detached from the tire and which will be held against collapse while being placed upon the wheel.

The invention is illustrated in the accompanying drawings, in which—

Figure 1 is a side elevation of a wheel with my improved rim applied thereto;

Fig. 2 is a detail perspective view of the parts of the rim showing the same separated;

Fig. 3 is an enlarged detail plan view of the locking joint.

Figs. 4 and 5 are transverse sections showing different forms of rims and tires.

The wheel 1 may be of the usual or any preferred construction and the rim constituting my invention may be attached to the wheel by any convenient or preferred means, the drawing showing lugs or plates 2 secured at intervals to the felly of the wheel and projecting over the edge of the rim 3 to prevent lateral movement of the same. The rim 3 consists of a plurality of sections 4, 5, 6 and 7 which are connected at their meeting ends by hinges so that they may be folded together to be quickly removed from the tire when it is necessary to repair the tire or substitute a new tire for a worn out tire. The several rim sections are constructed with beads or clencher flanges 8 which are adapted to engage the tire casing in the usual well known manner. The meeting ends of the sections 4 and 5 are equipped with hinge members 9 and 10 through which a pintle or hinge pin 11 is inserted to hingedly connect the said sections, and the opposite ends of the said sections are connected in a similar manner to the meeting ends of the sections 6 and 7 respectively. The several hinges will be seated in suitably shaped recesses provided therefor in the felly of the wheel so that the rim may rest directly against the outer periphery of the felly and thereby firmly support the tire. The section 5 is formed with an opening 12 to accommodate the inflation valve, indicated at 13, while the section 4 is provided with a lug or projection 14 upon its inner surface adapted to engage a suitably shaped recess or notch in the felly whereby creeping of the rim about the wheel will be prevented. It will be readily understood that the hinges connecting the sections 4 and 5 to each other and to the sections 6 and 7 respectively, are ordinary abutting hinges so that the meeting ends of the rim sections may squarely abut and there will consequently be no open space between the rim sections to pinch or injure the tire casing or tube.

The meeting ends of the sections 6 and 7 carry upon the outer surfaces of the flanges 8 hinge plates or brackets 16 to which are pivotally connected the ends of links 15 so that the said sections may move inwardly between the sections 4 and 5 when the rim is collapsed. To prevent collapse of the rim when it is in the rack or when it is being handled preparatory to being placed upon the wheel, I secure to the inner peripheral surface of the section 6 a locking plate 17 which projects across the meeting ends of the sections and rests against the inner peripheral surface of the section 7. Upon the section 7, I pivot a lever or keeper 18, one end of which is offset so as to project over the adjacent end of the locking plate 17, as clearly shown in Fig. 3. It will be readily understood that with the members 17 and 18 arranged as shown in the drawings, inward movement of the meeting ends of the sections 6 and 7 will be positively prevented so that a rim with the tire fitted thereon may be freely handled without any liability of the separation of the tire from the rim. Guide plates or cleats 20 are secured upon and project from the member 7 to extend alongside the plate 17 and thereby prevent the members getting out of alinement or overlapping when being inserted in the tire. Should it be necessary to repair the tire, the rim is removed from the wheel and the lever or keeper 18 swung about its pivot 19 so that it will be out of alinement with the locking plate 17 and, consequently, will not overlap the same. The sections 6 and 7 may be swung inwardly about their hinge connections with the sections 4 and 5 respectively, and the latter sections will swing toward each other, as will be readily understood, the links 15 being detached from one section, if the movement permitted without detaching them is insufficient. This folding of the rim will withdraw it from the tire so that the tire and the rim will be very quickly separated and the necessary repairs made.

My improved rim may be placed upon any wheel and obviously will facilitate the repairing of pneumatic tires inasmuch as it will automatically release itself from the tire when it is folded.

In the form shown in Fig. 4, the flange 8 rises from the rim at a right angle thereto while the clencher bead on the tire has a round surface. Consequently, an air space 21 will be formed between the tire and the rim so that the tire cannot freeze to the rim.

In the form shown in Fig. 5, the tire has a straight wall while the rim flange is bent inward at its edge to grip the tire. An air space is thus provided to prevent freezing of the tire to the rim and the engagement of the rim and the tire is such as to reduce the liability of blow-outs.

Having thus described the invention, what is claimed as new is:

1. A wheel rim consisting of a plurality of sections hinged together at their meeting ends, a locking plate secured to one of the sections at the end of the same and projecting over the meeting end of an adjacent section, guides on said adjacent section projecting over the end of the first-mentioned section at the sides of the locking plate and a keeper pivoted upon said adjacent section and adapted to engage over said locking plate.

2. A wheel rim consisting of a plurality of sections, plates secured upon the edges of two of the sections at the meeting ends of the same, links pivoted to and connecting said plates, and hinge members fitted to and connecting the other sections at the meeting ends of the same.

In testimony whereof I affix my signature.

OHMER H. BARTHOLOMEW. [L. s.]